United States Patent
Montoya (10) Patent No.: US 8,537,974 B2
(45) Date of Patent: Sep. 17, 2013

(54) SYSTEM AND METHOD FOR FACILITATING EMERGENCY CALLING FROM A REMOTE TERMINAL

(75) Inventor: Alex Montoya, Westminster, CO (US)

(73) Assignee: Intrado, Inc., Omaha, NE (US)

( * ) Notice: Subject to any disclaimer, the term of this patent is extended or adjusted under 35 U.S.C. 154(b) by 1865 days.

(21) Appl. No.: 11/538,868

(22) Filed: Oct. 5, 2006

(65) Prior Publication Data

US 2007/0121802 A1 May 31, 2007

Related U.S. Application Data

(60) Provisional application No. 60/723,885, filed on Oct. 5, 2005.

(51) Int. Cl.
*H04M 11/04* (2006.01)
*H04Q 11/04* (2006.01)

(52) U.S. Cl.
USPC ...... 379/37; 379/9.05; 379/14.01; 379/32.04; 379/142.06; 379/242; 455/127.1; 709/223; 709/228; 725/78

(58) Field of Classification Search
USPC .............. 379/32.04, 33, 45, 88.2, 142.06, 379/266.02, 9.05, 14, 14.01, 15.02, 15.03, 379/15.04, 112.02, 221.04, 244, 279, 221.03; 455/127.1; 709/223, 228; 725/78
See application file for complete search history.

(56) References Cited

U.S. PATENT DOCUMENTS

| | | | | |
|---|---|---|---|---|
| 4,051,522 A | * | 9/1977 | Healy et al. ............... | 725/78 |
| 4,251,880 A | | 2/1981 | Baugh et al. | |
| 5,323,444 A | * | 6/1994 | Ertz et al. ............... | 379/45 |
| 5,379,337 A | * | 1/1995 | Castillo et al. .............. | 379/45 |
| 5,418,776 A | | 5/1995 | Purkey et al. | |
| 6,023,612 A | * | 2/2000 | Harris et al. ............... | 455/127.1 |
| 6,229,886 B1 | | 5/2001 | Moody et al. | |
| 6,252,943 B1 | * | 6/2001 | Johnson et al. ............. | 379/45 |
| 6,366,662 B1 | | 4/2002 | Giordano et al. | |
| 6,434,612 B1 | * | 8/2002 | Hughes et al. ............. | 709/223 |
| 6,493,337 B1 | | 12/2002 | Stevenson | |
| 6,721,395 B2 | | 4/2004 | Martinez | |
| 6,993,118 B2 | * | 1/2006 | Antonucci et al. .......... | 379/45 |
| 7,319,747 B2 | * | 1/2008 | Smith ...................... | 379/244 |
| 7,366,784 B2 | * | 4/2008 | Ishizaki .................... | 709/228 |
| 7,440,442 B2 | * | 10/2008 | Grabelsky et al. ........... | 370/352 |
| 7,680,252 B2 | * | 3/2010 | Elder ....................... | 379/37 |
| 7,756,254 B1 | * | 7/2010 | Croak et al. ................ | 379/46 |
| 2004/0136520 A1 | | 7/2004 | Ehreth et al. | |
| 2006/0067485 A1 | * | 3/2006 | Beason et al. .............. | 379/45 |
| 2006/0098791 A1 | | 5/2006 | Elder | |
| 2007/0003024 A1 | * | 1/2007 | Olivier et al. .............. | 379/45 |
| 2007/0121801 A1 | * | 5/2007 | Montoya .................... | 379/37 |
| 2008/0240371 A1 | * | 10/2008 | Gray ........................ | 379/37 |
| 2009/0003535 A1 | * | 1/2009 | Grabelsky et al. ........... | 379/45 |
| 2009/0067584 A1 | * | 3/2009 | Waters et al. .............. | 379/45 |
| 2009/0110154 A1 | * | 4/2009 | Colunga ................... | 379/45 |
| 2009/0168974 A1 | * | 7/2009 | Mc Cormick .............. | 379/45 |

(Continued)

*Primary Examiner* — Gerald Gauthier (57) ABSTRACT

A system and method to expedite special number calls from a remote terminal that employs call control system comprising a control module and a translations database and is connected to the trunk group between the remote terminal and the local switching office. The translations database maintains translations for its associated remote terminal special number calls, including, but not limited to, 9-1-1 calls. When the call control system recognizes a special number call, it performs a look up in its translation database using the line ID as a key and substitutes a destination number for the special number and a calling line telephone number for the line ID. The call control system forwards the call to the local switching office, which treats the call as a trunk-to-trunk call. Advantageously, one (or more) trunk of the trunk group may be reserved solely for special number calls.

20 Claims, 8 Drawing Sheets

(56) References Cited

U.S. PATENT DOCUMENTS

2009/0253399 A1* 10/2009 Snapp .................. 455/404.1
2009/0296899 A1* 12/2009 Beason et al. ............ 379/45
2009/0296900 A1* 12/2009 Breen et al. .............. 379/45
2010/0020942 A1* 1/2010 Olshansky et al. ........ 379/45
2010/0046489 A1* 2/2010 Dickinson et al. ....... 370/338
2010/0272242 A1* 10/2010 Croy et al. ................ 379/45
2011/0058658 A1* 3/2011 Li ............................ 379/45
2011/0081010 A1* 4/2011 Mitchell ............. 379/142.06

* cited by examiner

SYSTEM AND METHOD FOR FACILITATING EMERGENCY CALLING FROM A REMOTE TERMINAL

CROSS REFERENCE TO RELATED APPLICATIONS

This application is related to and claims the benefit of the filing date of U.S. Provisional Patent Application Ser. No. 60/723,885 entitled "SYSTEM AND METHOD FOR FACILITATING EMERGENCY CALLING FROM A REMOTE TERMINAL," by Alex Montoya, which was filed on Oct. 5, 2005, and is also related to U.S. Patent Application entitled "SYSTEM AND METHOD FOR MAINTAINING A TRANSLATIONS DATABASE TO EFFECT CALL CONTROL AT A REMOTE TERMINAL," by Alex Montoya and filed on even data with this patent application, both of which are incorporated by reference in their entirety.

BACKGROUND OF THE INVENTION

This invention relates to the field of remote terminals as used in wireline telephony, and, more specifically, to a call control system for use with a remote terminal to move routing of emergency or other special telephone calls closer to the calling telephone and thus improving connection time.

Wireline telephone local exchange carriers use remote terminals (such as, but not limited to, subscriber loop carriers and digital loop carriers) to serve customer telephones that are too far from the nearest local switching office to provide acceptable service directly. A remote terminal is connected to a local switching office by one or more trunk groups, which provide voice paths and a control path between the local switching office and the remote terminal. The local switching office controls the remote terminal as if it were merely an extension of the switching office. There is no local controller or switch fabric in a remote terminal to save on cost, complexity and space. In this manner, subscribers that otherwise could not be served by conventional wireline telephony can be served by a remote terminal. Further, the telephone local exchange carrier does not have to build or buy expensive local switching offices or remote switching modules to serve only a few subscribers.

A problem in the art, however, is that call completion can be delayed because control of the remote terminal is tightly coupled to the local switching office. A remote terminal is deemed to be "tightly coupled" to the local switching office because the local switching office performs all of the telephony functions, such as (but not limited to) digit collection, translations, routing decisions, etc., for every call from every remote terminal connected to it. It is known in the art that call completions are slowed by concentration in the line unit, transmission conversions, the transmission itself and the reconversion at the local switching office. The round trip from remote terminal to local switching office to remote terminal also introduces some delay.

For most purposes, such delay is minimal and not noticed by the consumer. Certain classes of calls, however, are affected more than others. These calls are generally known in the art as "special number" calls. Examples of special number calls include, but are not limited to, operator, international operator, international calls, information and, importantly, emergency services calls (herein "9-1-1 calls").

It is well known in the art that, if a caller to 9-1-1 is not connected to a public safety answering point operator with ten seconds, the caller is likely to end the call and call again. Repetitive 9-1-1 calls only increase delay, because call resources in both the local switching office and the remote terminal have to be torn down and reallocated by the local switching office for every call. If the remote terminal, the local switching office, or both, are busy, then there is also a possibility that a 9-1-1 call may not get through at all because of lack of resources.

Thus, there is a need in the art for a system that can expedite 9-1-1 and other special calls from a remote terminal to the public safety answering point.

SUMMARY OF THE INVENTION

This problem is solved and a technical advance is achieved in the art by a system and method that employs a call control system to expedite special number calls from a remote terminal. A call control system in accordance with this invention comprises a control module, a translations database and a switching fabric, which are connected to the trunk group between the remote terminal and the local switching office. The translations database maintains translations for its associated remote terminal special number calls, including, but not limited to, 9-1-1 calls. When the call control system recognizes a special number call, it performs a look up in its translation database using the line ID as a key and substitutes a destination number for the special number and a calling line telephone number for the line ID. The call control system forwards the call to the local switching office, which treats the call as a trunk-to-trunk call. The call effectively by-passes the local switching office, thus saving time. Advantageously, one (or more) trunk of the trunk group may be reserved solely for special number calls.

In accordance with another aspect of this invention, a remote terminal office administration and maintenance (OA&M) system monitors an OA&M update line between the local exchange OA&M system and the local switching office. Any changes that affect a line associated with a remote terminal served by a call control system is copied and sent to the appropriate call control system. In this manner, all changes that affect delivery of calls to special numbers are maintained in synchronization between the call control system and the local switching office.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
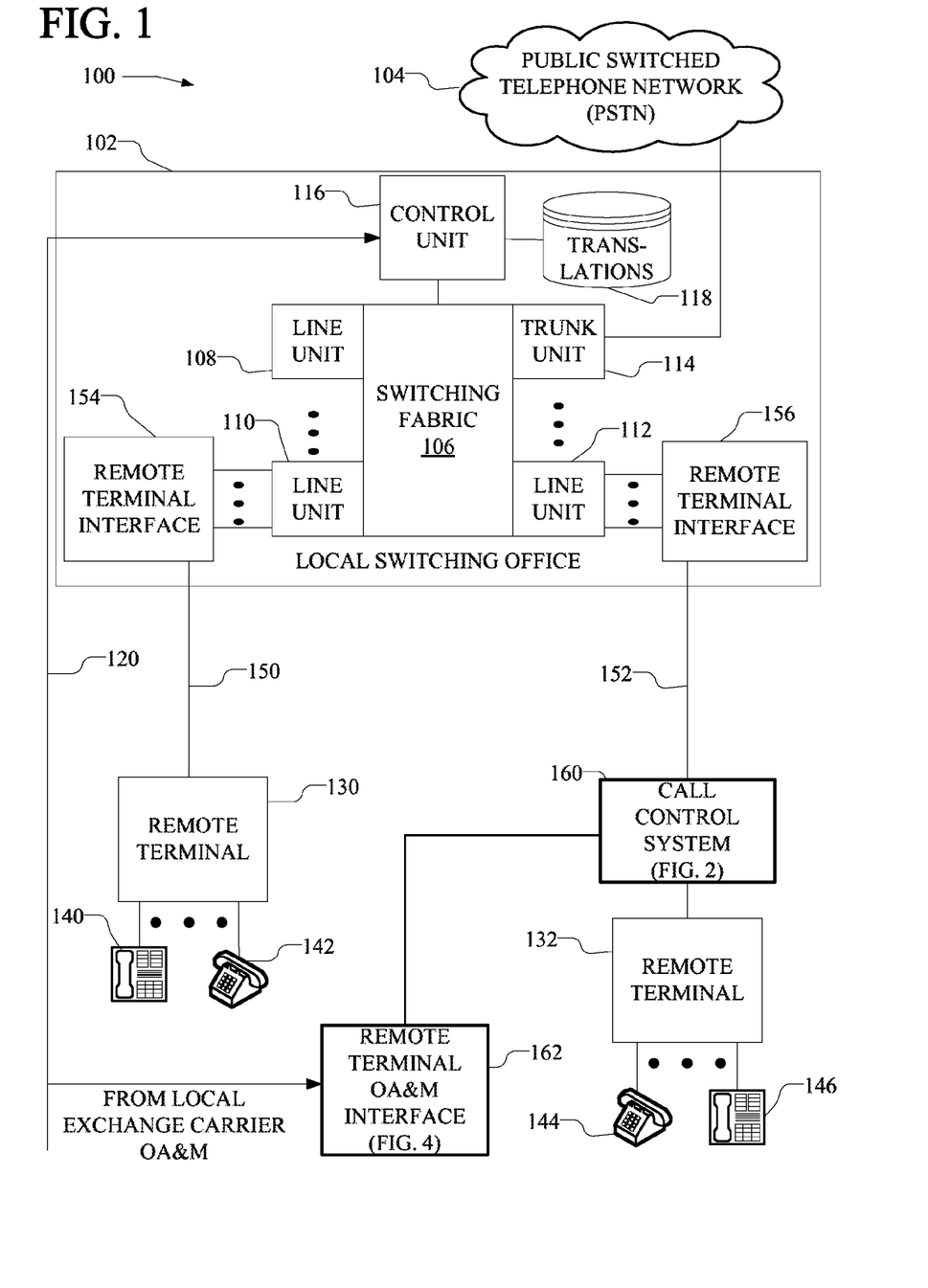
FIG. 1 is a block diagram of a wireline telephone system in which an exemplary embodiment of this invention is implemented.

FIG. 1 is a block diagram of a wireline telephone network 100 in which an exemplary embodiment of this invention operates. In the wireline telephone network 100 of FIG. 1, a local switching office 102 is connected to the public switched telephone network (PSTN) 104. This configuration is used herein for convenience and clarity in describing the invention; it is well known in the art that local switching office 102 is part of PSTN 104. Local switching office 102 comprises a switching fabric 106 that interconnects a plurality of line units, herein represented by line units 108, 110 and 112 and trunk units, herein represented by trunk unit 114. (Other units, such as global services units, etc., are not shown but are well known in the art and thus not described.) Switching fabric 106, line units 108, 110 and 112 and trunk unit 114 are all well known in the art, do not form part of the invention and thus are not further described.

A control unit 116 causes switching fabric 106 to connect a particular line (or member of a trunk group) to another based on information contained in translations database 118. Control unit 116 and translations database 118 are also well known in the art, form no part of this invention, and are thus not described further. Importantly, translations database 118 is kept current via a connection 120 to a centralized office administration and maintenance (OA&M) system (not shown but well known in the art). In this manner, the local exchange carrier can modify translations database 118 without having to enter each change manually at local switching office 102.

In order to provide service to customers who are beyond the range of wireline transmission, operating companies connect remote terminals, represented by remote terminal 130 and remote terminal 132, between local switching office 102 and a plurality of distant customer telephones, represented by telephones 140, 142, 144 and 146. In general, remote terminals 130 and 132 consolidate and concentrate signals to and from the distant customer telephones and connect the distant customer telephones to the local switching office 102 over transmission media 150, 152 (e.g., fiber optical cables) that do not have the same distance limitations as telephone lines. Transmission media 150, 152 generally comprise trunks (as known in the art) and are therefore referred to hereinafter as "trunks."

In local switching office 102, each trunk 150, 152 is connected to a remote terminal interface 154, 156 (respectively), that provides a line appearance for each telephone (e.g., telephones 140, 142, 144 and 146) at a respective line unit (illustrated herein as 110 and 112). Such remote terminals 150 and 152 and remote terminal interfaces 154 and 156 are known in the art as subscriber loop carriers ("SLC's") and digital loop carriers ("DLC's"), depending upon the transmission medium and the protocol used for supporting such systems. For example, GR-303 and TR08 are commonly used protocols for providing remote terminal service. While some remote terminals (especially older remote terminals) use proprietary protocols, it is within the ability of one skilled in the art to build a call control system in accordance with whatever protocol is used after studying this specification.

As is standard in the art, control unit 116 of local switching office 102 controls all remote terminals (herein 130 and 132). Thus, when a telephone (such as telephone 142) goes off-hook, remote terminal 130 detects the off-hook condition and reports the off-hook condition to remote terminal interface 154. Remote terminal interface 154 forwards the information to control unit 116. Control unit 116 causes line unit 110 to provide dial tone through remote terminal interface 154, trunk 150 and remote terminal 130 to telephone 142. Telephone 142 then sends dual-tone, multifrequency signals (or dial pulses) back to control unit 116, which decodes the signals into digits and performs a look-up in translations database 118 to determine how to handle the call.

In the illustrative embodiment of FIG. 1, local switching office 102 supports two remote terminals 130 and 132. Remote terminal 130 is connected directly to local switching office 102. Because all control of remote terminal 130 is provided by control unit 116 of local switch office 102, no service is or can be provided to telephones 140 and 142 when service is interrupted anywhere between remote terminal 130 and local switching office 102. Such service interruptions include, but are not limited to, breaks in trunk 150, remote terminal interface 154 problems, a problem with control unit 116 or an outage of the entire local switching office 102.

In accordance with this invention, a call control system 160 (illustrated herein in heavy block line and described in more detail in connection with FIG. 2) is connected across trunk 152 between remote terminal 132 and remote terminal interface 156. In accordance with this exemplary embodiment of this invention, call control system 160 monitors trunk 152 for control signals between control unit 116 and remote terminal 132. When such signals are not present on trunk 152 (for whatever reason) call control system 160 takes over control of remote terminal 132 so that calls may be completed (at least) between telephones connected to remote terminal 132. Additionally, call control system 160 can perform other functions in conjunction with local switching office 102 when local switching office 102 and remote terminal 132 are fully operational. For example, call control system 160 may expedite special number calls (described further, below, in connection with FIGS. 6 and 7).

Call control system 160, as will be described further, below, in connection with FIG. 2, includes a controller and a translation database containing information regarding remote terminal 132, and its connected telephones (e.g., telephone 144 and telephone 146). As is known in the art, translation database 118 of local switching office 102 is updated regularly (to add, delete or change telephone numbers and line ID's, for example). In order to keep translation database of call control system 160 synchronized with translation database 118 of local switching office 102, call control system 160 is connected to a remote terminal OA&M interface 162 (shown in heavy block line) that monitors OA&M channel 120 for changes affecting remote terminal 132. Advantageously, remote terminal OA&M interface 162 monitors OA&M channel 120 for a plurality of switch proxies (not shown).

In this manner, some basic services that formerly were not available when remote terminal 132 is isolated from local switching office 102 are now available. For illustration purposes, assume that remote terminal 132 provides service to a rural community several miles from local switching office 102. Further, assume that telephone 146 is a telephone at a local public safety provider, such as (but not limited to) a local fire department or county sheriff's office. In the prior art, a caller at telephone 144 could not contact telephone 146 in an emergency, even though both telephones are in the same community, because of a problem or an outage that occurs miles away. In accordance with this invention, call control system 160 takes over during an outage and provides at least limited local service. Thus, telephone 144 can be connected to telephone 146 in accordance with this invention, even when local switching office 102 cannot provide service.

Figure 2:
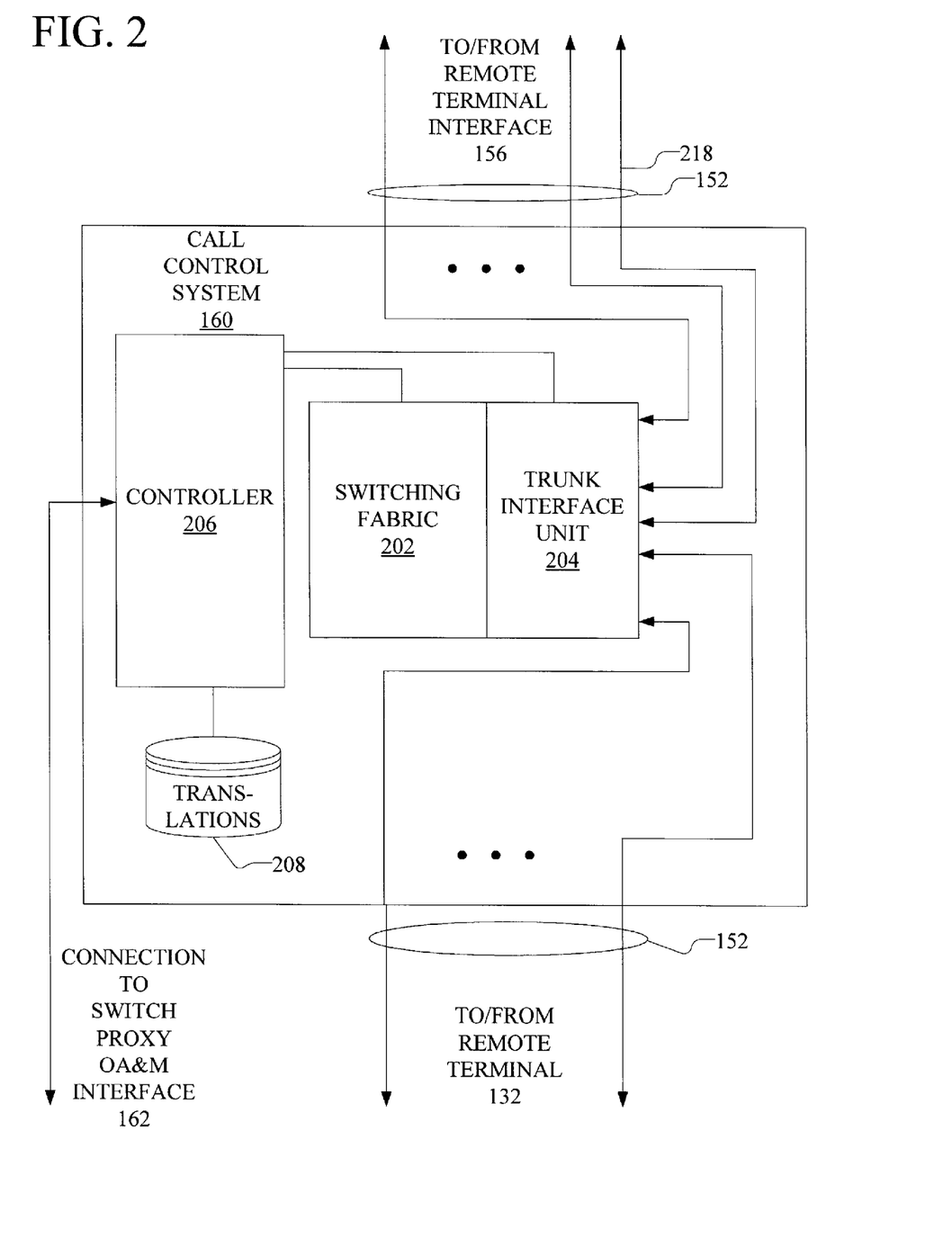
FIG. 2 is a block diagram of an exemplary embodiment of the call control system of FIG. 1.

Turning now to FIG. 2, a block diagram of a call control system 160 in accordance with aspects of this invention is illustrated. In general, call control system 160 comprises a switching fabric 202 interconnected with a trunk interface unit 204. In this exemplary embodiment, switching fabric 202 comprises a time slot interchange unit. One skilled in the art will appreciate that other types of switching fabrics may be employed depending upon the type of trunks or transmission media connected thereto.

Continuing with this exemplary embodiment of this invention, trunk interface unit 204 is connected to remote terminal 132. Controller 206 receives signals from telephones connected to remote terminal 132 via trunk interface unit 204, switching fabric 202 or both, interprets the signals and causes switch fabric 202 to connect one telephone to another. Controller 206 uses data stored in translation database 208 to provide such connections. As stated above, the data in translation database 208 is synchronized to translation database 118 regarding telephones connected to remote terminal 132. Such synchronicity is provided by the remote terminal OA&M system (which will be described herein, below, in connection with FIG. 4).

Trunk 152 is also connected to trunk interface unit 204 on the remote terminal interface 156 side of call control system 160. Trunk interface unit 204 monitors trunk 152 for control signals from local switching office 102. When no signals are detected, then trunk interface unit 204 notifies controller 206. In response, controller 206 begins to supervise lines from remote terminal 132. When control signals are present on trunk 152, then communications circuits are merely connected through switching fabric 202 and back out trunk interface unit 204 (known in the art as "hairpinning"). Such hairpins comprise permanent (or semi-permanent) connections through switching fabric 202 (also called "nailed up"). In this exemplary embodiment, wherein switching fabric 202 comprises a time slot interchange unit, predetermined time slots are reserved for such nailed up connections. Thus, the call control system 160, in accordance with this embodiment of the invention, is generally transparent to call control during normal operations (i.e., remote terminal 132 is controlled by local switching office 102).

In accordance with one specific embodiment of this invention, one (or more) member 218 of trunk 152 is reserved for special number calls. As will be described further, below, call control system 160 may use these facilities to connect such special number calls directly, thus by-passing control of these outbound calls by local switching office 102. Such special number calls include, but are not limited to, emergency number calls ("9-1-1").

Figure 3A:
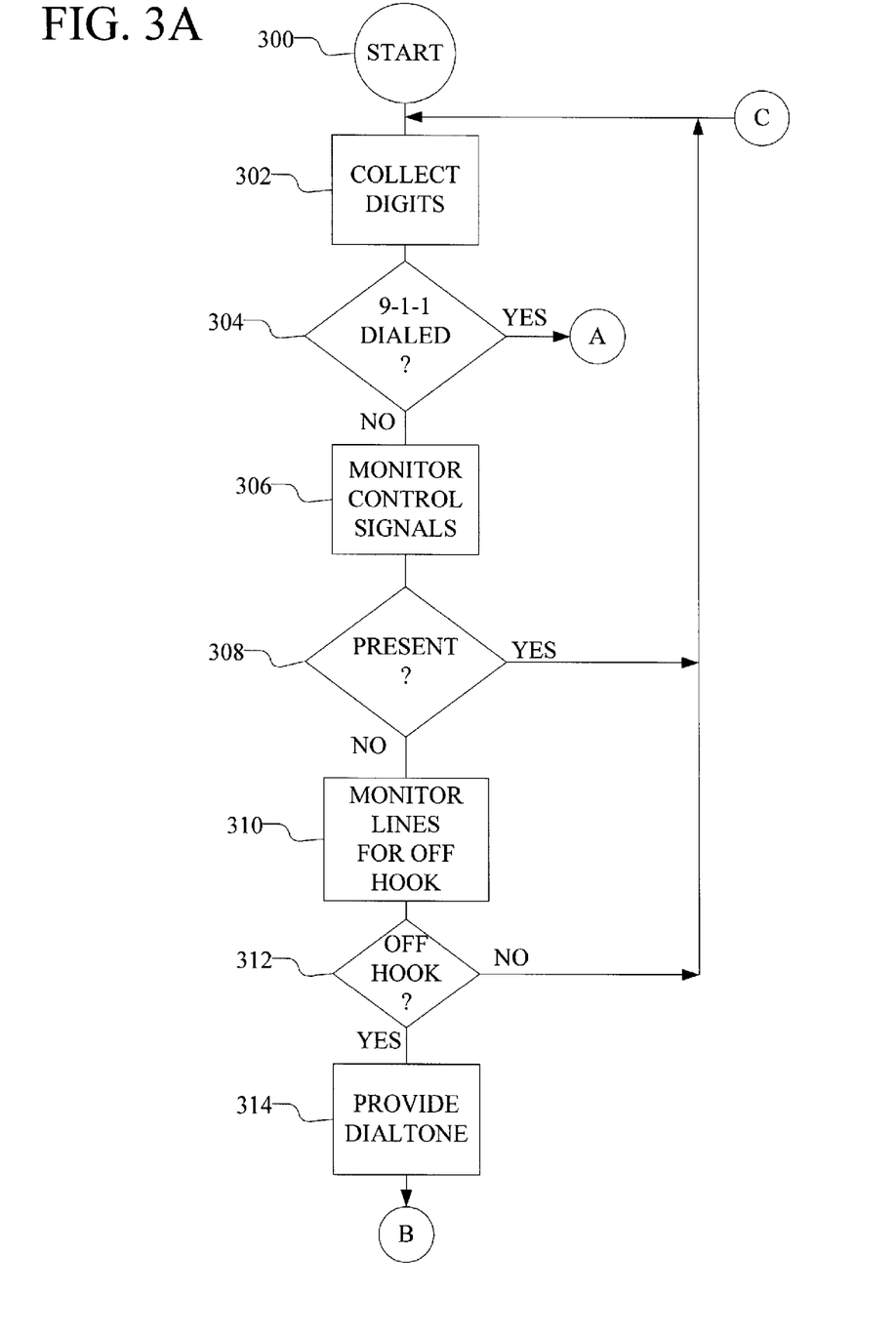
FIGS. 3A and 3B are flow charts illustrating the operation of the call control system shown in FIGS. 1 and 2.
Figure 3B:
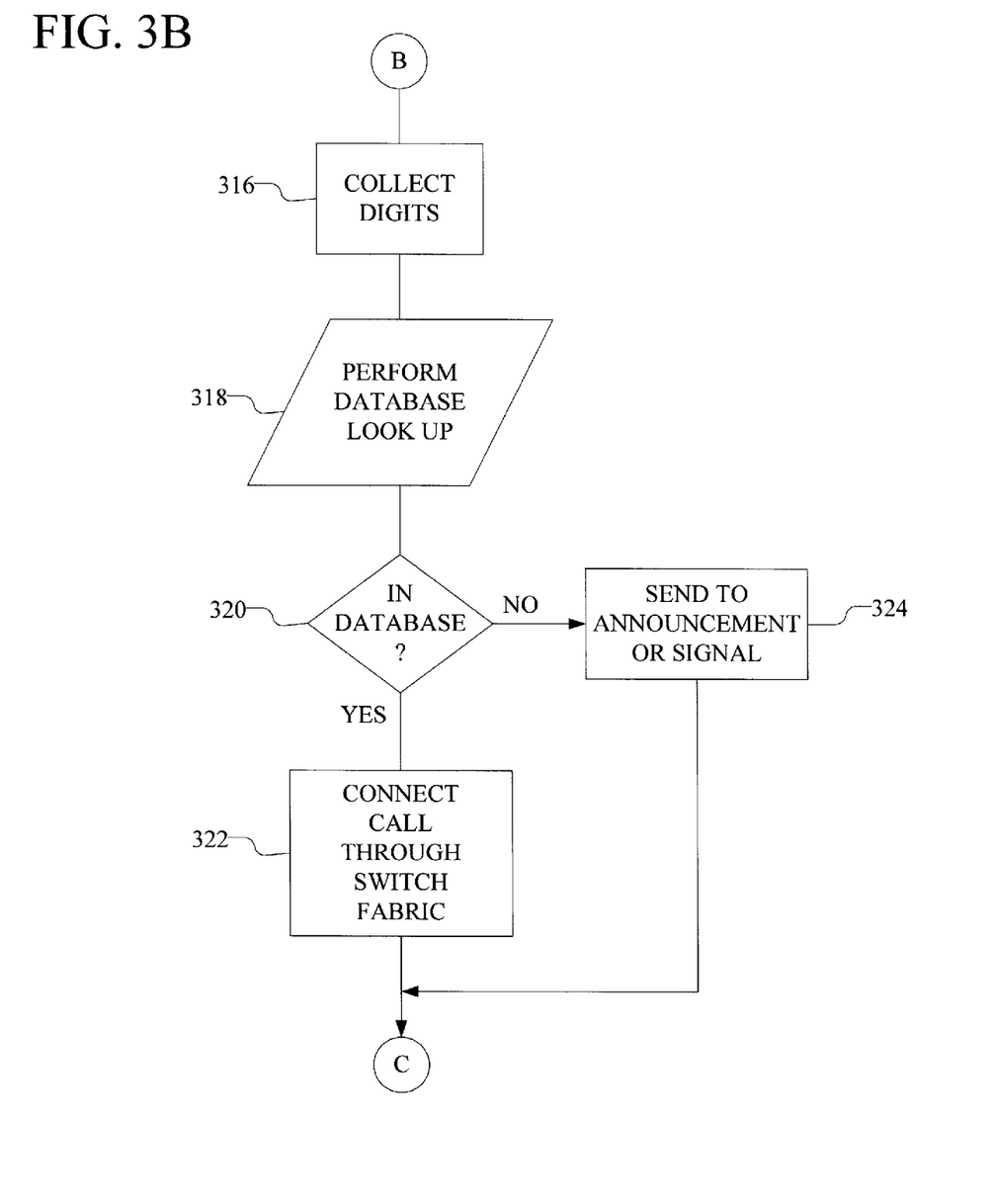

The flow of operations of controller 206 will now be illustrated in FIGS. 3A and 3B taken in connection with FIG. 2. Operation is described herein in terms of supervising lines for off hook. One skilled in the art will appreciate how to provide other telephony services after studying this specification.

Operation starts at circle 300 of FIG. 3A, and moves to operation box 302, where trunk monitoring unit 214 monitors all individual trunks for a predefined outbound call, which, in this exemplary embodiment, comprises the digit string "9-1-1." Such monitoring may be accomplished by intercepting all digit signals. When an initial "9" is dialed the line is monitored for more digits. If the "9" is not followed by "1-1," then all intercepted digits are forwarded to the remote terminal interface. One skilled in the art will be able to build a call control system that monitors for and intercepts calls to special numbers in accordance with this invention after reviewing this specification.

If 9-1-1 (or other special number) is dialed, as determined in decision diamond 304, then processing proceeds through connector A to FIG. 7 (which is described further, below). If 9-1-1 was not dialed, then processing continues to operation box 306, where trunk monitoring unit 214 monitors trunk 152 for control signals. Processing proceeds to decision diamond 308, where a determination is made whether control signals are present on transmission medium 152. If control signals are present, processing loops back to operation box 302.

If, in decision diamond 308, a determination is made that control signals are not present, then processing proceeds to operation box 310, where controller 206 monitors trunk interface unit 204 for off hook condition on any of the supported telephones (e.g., telephones 144 and 146). Processing continues to decision diamond 312, where a determination is made whether an off hook condition is detected. If off hook is not detected, then processing loops back to operation box 302.

If, in decision diamond 312, a determination is made that an off hook condition is present, then processing proceeds to operation box 314, where controller 206 causes dialtone to be provided. Processing continues through connector B to FIG. 3B.

Turning now to FIG. 3B, processing starts at connector B and proceeds to operation box 316, wherein the off hook line is monitored for digit signals. Next, call control system 160 performs a database lookup in operation box 318. In this step, controller 206 of call control system 160 uses the collected digits as a key into translation database 208. A determination is made in decision diamond 320 whether the call can be completed as dialed. In this exemplary embodiment, only calls to lines connected to remote terminal 132 may be completed. Therefore, if the call is to a number not in translation database 208, then the call is sent to announcement or signal in box 324. If the call can be completed as determined in decision diamond 316, then the call is connected through switch fabric in box 322. In an exemplary embodiment wherein 9-1-1 were the dialed digits (when the call control system and remote terminal are in stand-alone mode), there may be a calling "tree" as is known in the art, so that the call is completed. Processing loops back to FIG. 3A via connector C.

While this invention is described in terms of wireline (circuit-switched) telephony, the principals of this invention may be applied to other forms of telephony. For example, a call control system may control a remote terminal that supports voice over Internet protocol (better known simply as "VoIP"). Instead of monitoring lines for signals, the call control system monitors data packets for control content. It is within the ability of one skilled in the art to modify this invention to support other types of telephony after studying this specification.

Figure 4:
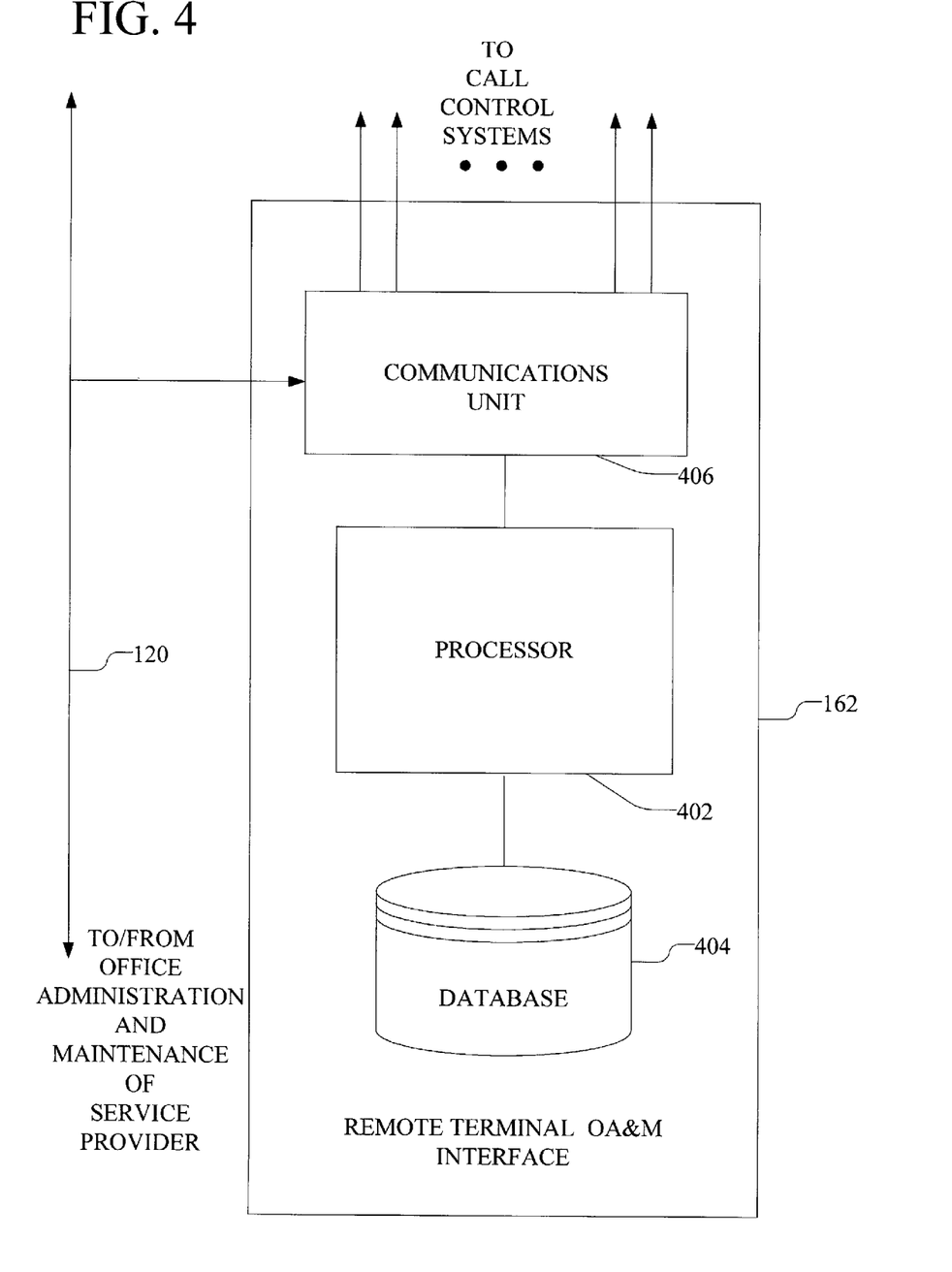
FIG. 4 is a block diagram of a remote terminal OA&M interface in the context of a wireline telephone network.

FIG. 4 is a block diagram of a remote terminal OA&M interface 162 in accordance with another aspect of this invention. Remote terminal OA&M interface 162 generally comprises a processor 402, a database 404 and a communications unit (or units) 406. At least one record is kept for each call control system in database 404, wherein translations for each line served by a call control system (such as lines 144 and 146) is maintained.

Figure 5:
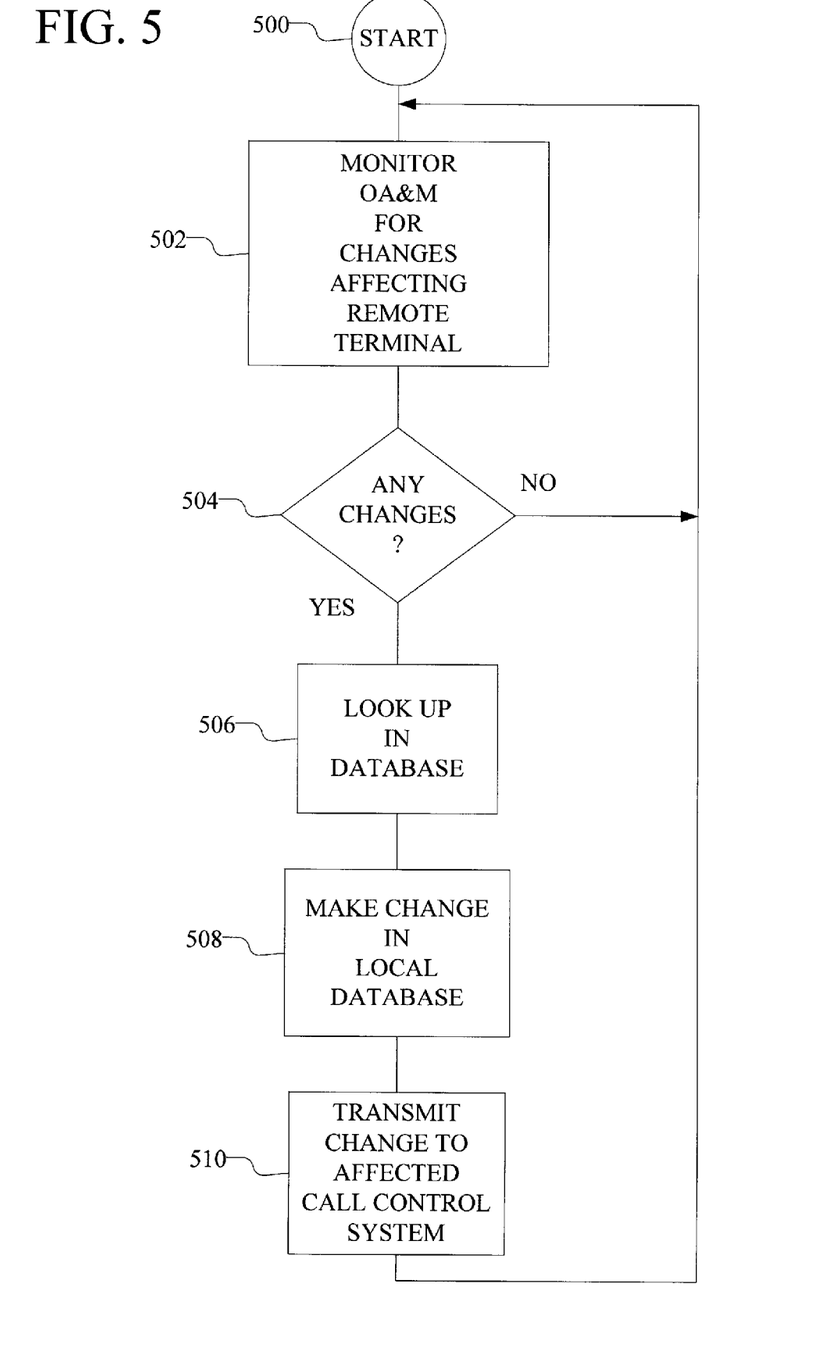
FIG. 5 is a flow chart illustrating the operation of the remote terminal OA&M interface of FIG. 4.

The operation of remote terminal OA&M interface 162 will now be described in the context of the flow chart of FIG. 5 taken in conjunction with the block diagram of FIG. 4. Processing starts in circle 500. In box 502, communications unit 406 monitors OA&M channel 120 and passes data received to processor 402. Processor 402 determines whether the OA&M data affects any line served by a call control system by comparing the data received to data in database 404 in decision diamond 504. If no change affecting any call control system is detected, then processing loops back to box 502 and the change is ignored.

If, in decision diamond 504, a change affecting one or more lines served by a call control system in accordance with this invention is detected, then a database lookup is performed on the affected line or lines in box 506. Changes are recorded in database 404 in box 508. Finally, all changes are transmitted to the affected call control system via communications unit 406. The changes may be transmitted when received or may be transmitted as a batch job during non-peak times.

While this exemplary embodiment is described in terms of a direct connection between remote terminal OA&M interface 162 and one or more switch proxies, one skilled in the art will realize that there are many ways to provide this interconnection. For example, remote terminal OA&M interface 162 may be connected to the call control system's local switching office. In this scenario, the remote terminal OA&M interface uploads changes for a call control system to the local switching office. At some convenient time, the call control system places a telephone call to the local switching office and downloads the changes. Alternatively, the local switching office may periodically download changes to the call control system on an unused trunk, on a dedicated trunk or on the control channel. Finally, the call control system may periodically call a special telephone number associated with remote terminal OA&M interface to obtain any updates.

Figure 6:
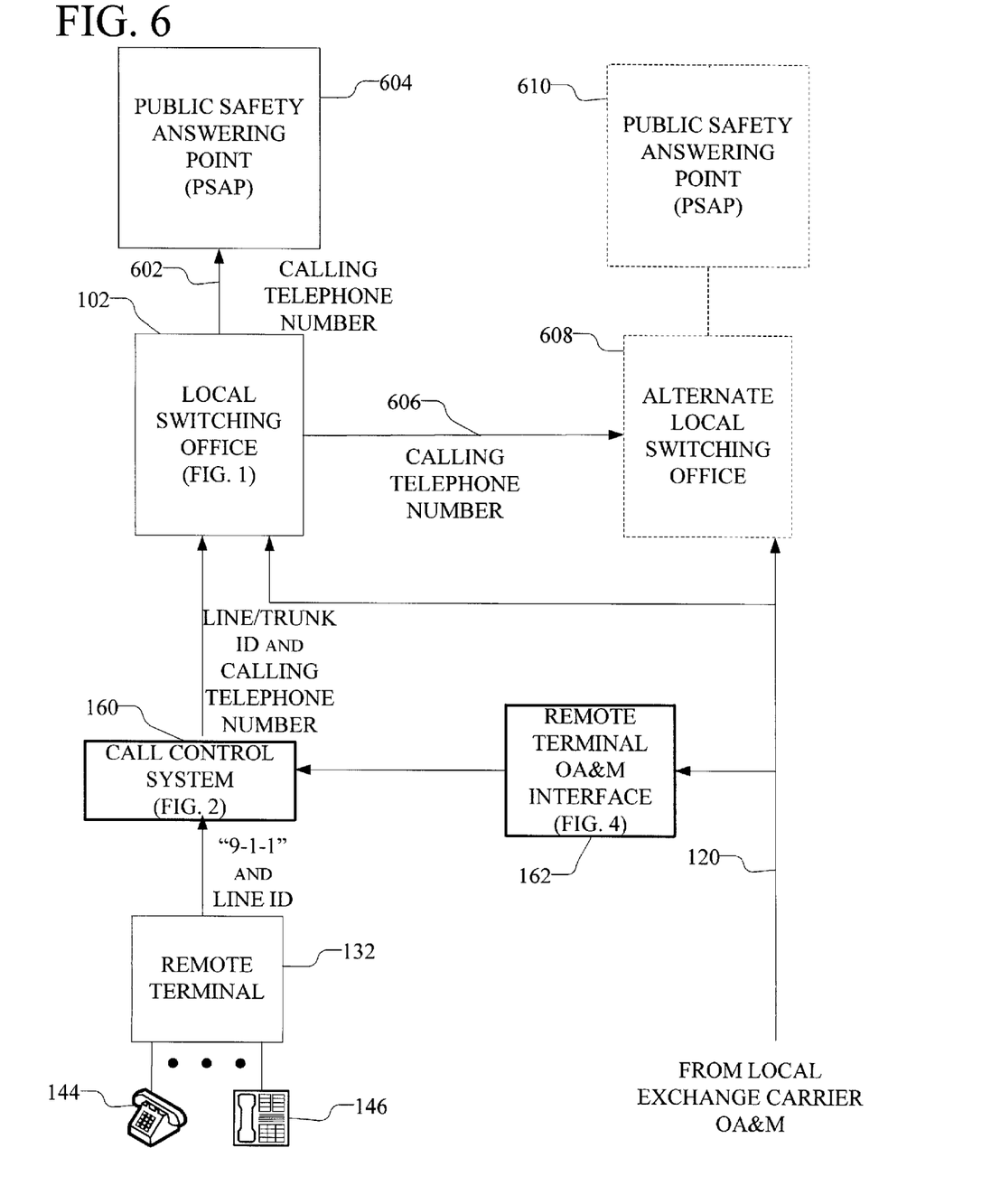
FIG. 6 is another view of the wireline telephone system of FIG. 1 in which another exemplary embodiment of this invention is implemented.

Turning now to FIG. 6, another view of the wireline telephone system of FIG. 1 is shown, in which another embodiment of the present invention operates. In this exemplary embodiment, call control system 160 operates on calls to special numbers, such as 9-1-1, in order to expedite call processing through PSTN 104. Call processing in relation to 9-1-1 is herein described to illustrate the embodiment and advantages of the invention. One skilled in the art will realize how to expedite call processing to any number, regardless of number of digits, after studying this specification. For example, calls to "0" may be routed specially to designated operator centers. Calls to "0-1-1" may be specially routed to international switching gateways. Further, one skilled in the art will realize that the database includes not only the usual destination, but also alternative destinations. For example, the database includes both the destination PSAP routing information and one or more alternate destinations in case the primary is unavailable. Thus, the call control system routes calls to an alternate number (e.g., the local fire or sheriff's department) if the remote terminal is in isolation.

In this exemplary embodiment of PSTN 104, local switching office 102 is connected via lines, trunks, or both lines and trunks (singularly or collectively labeled 602) to public safety answering point (PSAP) 604. Alternatively, local switching office may be connected via trunk 606 to alternate local switching office 608 (shown in phantom). Alternate local switching office 608 is connected to alternate PSAP 610 (also shown in phantom). Alternate PSAP 610 may be the designated PSAP to serve either or both telephones 144 and 146 or may be an alternate in case PSAP 604 cannot handle a call.

Figure 7:
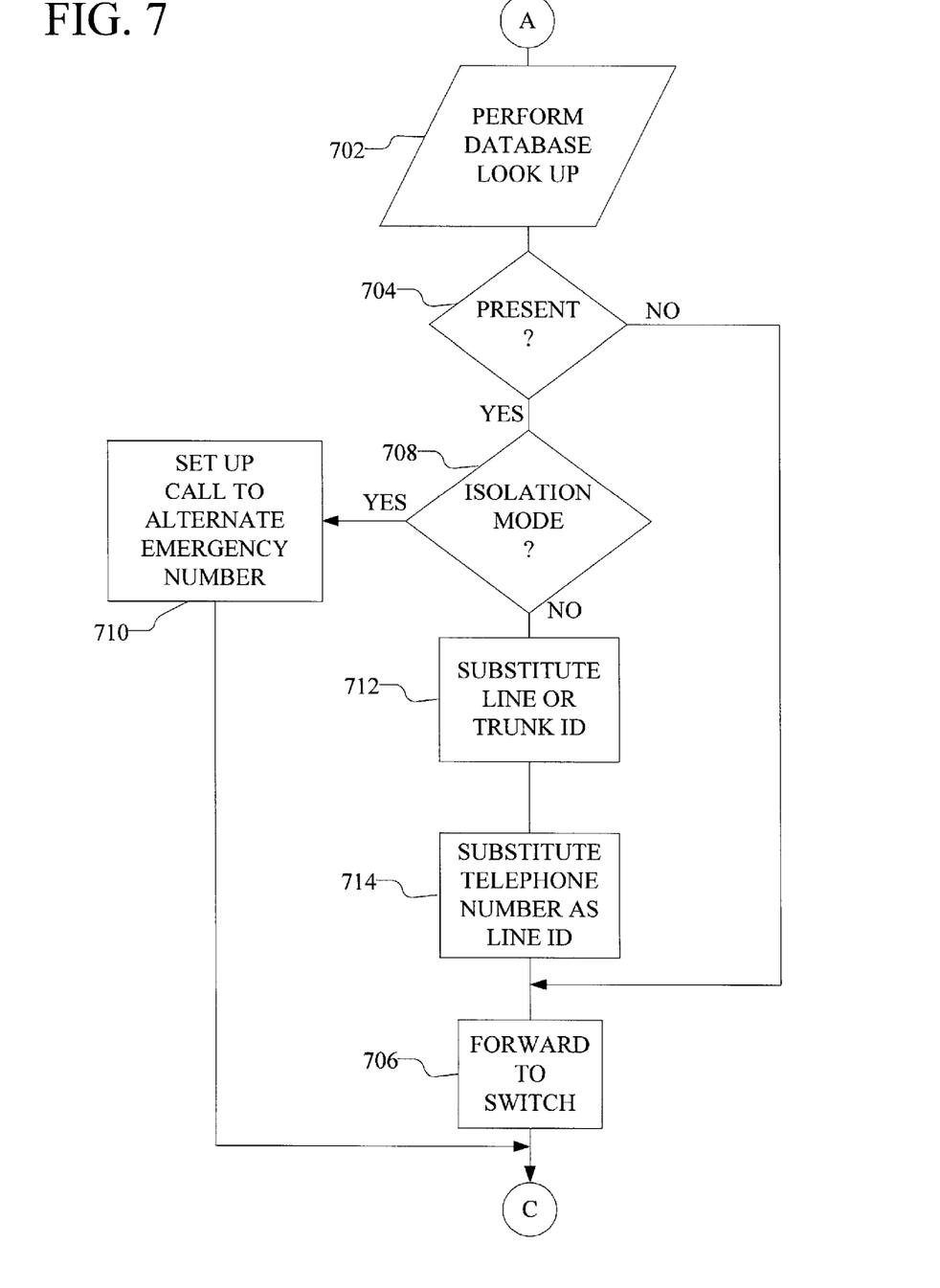
FIG. 7 is a flow chart illustrating the operation of the call control system of FIGS. 1, 2 and 6 for expediting special number calls in the wireline telephone system of FIG. 6.

Call processing is now described in the flow chart of FIG. 7 taken in conjunction with FIG. 6 As described above in connection with FIG. 3A, call control system 160 monitors remote terminal 132 for calls to 9-1-1. For purposes of this exemplary embodiment, the user of telephone 144 dials 9-1-1. The digits and the line ID are intercepted by call control system 160 (decision diamond 304, "yes" branch, connector A, FIG. 3A).

Processing begins in connector A and moves to database look up in 702. Call control system 160 performs a look up in its database for the line ID of telephone 144 to determine its designated public safety answering point (PSAP) and any (all) backup numbers. In general, a line ID or trunk ID is determined for the PSAP that serves the jurisdiction of the calling line ID and any line ID of backup public safety telephones connected to remote terminal 132. The telephone number of telephone 144 is retrieved from the database.

In decision diamond 704, a determination is made whether the line ID of the calling telephone is present in the database. If the line ID is not present, then the call is forwarded to the switch 706 and call processing returns to the monitor state, through connector C. If the line ID of the calling telephone is present, as determined in decision diamond 704, then a determination is made whether remote terminal 132 is isolated from its local switching office 102. If the remote terminal is isolated, then the call cannot be completed in the normal fashion to the serving PSAP. Therefore, in box 710, a call is set up to one (or more) lines connected to remote terminal 132. Call processing returns to the monitoring function through connector C.

If remote terminal 132 is not isolated, then, in box 712, call control system 160 substitutes the line or trunk ID, and in box 714, substitutes the telephone number of telephone 144 as the line ID. The call is then forwarded to local switching office 102 in box 714. Processing ends at connector C, which connects back to the monitoring functions described in FIGS. 3A and 3B.

Continuing with FIG. 6, local switching office 102 receives line or trunk ID and the calling telephone number from call control system 160. To local switching office 102, this call pair (routing ID and calling numbers) appears to be a line-to-line, line-to-trunk, trunk-to-line, or trunk-to-trunk call. The call is immediately forwarded on trunk 602 to PSAP 604. In The alternate exemplary embodiment, the call is delivered to alternate local switching office 608 via trunk 606, which then delivers the call to PSAP 610.

The above-described exemplary embodiment of this invention saves call-processing time and thus expedites calls that need to be expedited. In the prior art, local switching office 102 performs digit collection, digit analysis and the database look up based on calling line ID for all calls from its connected remote terminals 130, 132. Then local switching office 102 delivers the call to a selective router based on the database look up. Such actions are performed as a matter of routine, regardless of the nature of the call.

In direct contradistinction, this invention directly scans for special numbers (9-1-1 in the above exemplary embodiment), and takes action immediately. Local switching office 102 is effectively by-passed, thus saving time. It has been determined that, if a 9-1-1 call is not answered within 10 seconds, the attempt is abandoned and another attempt is made. By moving call routing for such service closer to the origin, and thus simplifying call routing through the PSTN, the call will by completed more rapidly than in the prior art.

In order to keep the records for such special calls synchronized with local switching office 102, remote terminal OA&M interface 162 monitors OA&M update channel 120. Any changes to local switching office 102 alternate local switching office that affects any telephone lines connected to remote terminal 132 and served by call control system 160 are forwarded to call control system 160.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

The invention claimed is:

1. A system for expediting a special number call from a remote terminal via a network; the system comprising:
 a remote terminal connected with a controlling local switching office via a call control apparatus; the local switching office being connected with the network; the remote terminal supporting a plurality of telephone lines connected with a plurality of remote calling instruments; each respective remote calling instrument of the plurality of remote calling instruments being situated beyond a range of acceptable wireline transmission from the local switching office; and the call control apparatus being coupled with the remote terminal and coupled with the local switching office; the call control apparatus including:

(1) a translations database configured to return a destination number and a calling line identification responsive to a query including a calling line identification received from a respective remote telephone;

(2) a controller configured to determine the calling line identification responsive to a respective remote telephone calling a special number; and (3) an update interface unit coupled with said controller and with said local switching office; said update interface unit substantially assuring that updates of at least one predetermined parameter provided to said local switching office are also automatically provided to said controller.

2. A system in accordance with claim 1 wherein the controller is further configured to forward the destination number and the calling line identification to the controlling local switching office.

3. A system in accordance with claim 1 wherein the update interface unit effects said assuring periodically.

4. A system in accordance with claim 1 wherein the translations database is configured to return one of a plurality of destination numbers.

5. A system in accordance with claim 1 wherein the special number comprises 9-1-1.

6. A system in accordance with claim 1 wherein the special number comprises 9-1-1 and the destination number comprises a routing number for a serving public safety answering point.

7. A method that expedites special number calling from a remote terminal via a network; the remote terminal being connected with a controlling local switching office coupled with the network; the remote terminal supporting a plurality of lines connected with a plurality of remote calling instruments; each respective remote calling instrument of the plurality of remote calling instruments being situated beyond a range of acceptable wireline transmission from the local switching office; the method comprising:

providing a call control system connected on a trunk between the remote terminal and the local switching office;

providing an update interface unit coupled with said call control system and with said local switching office; said update interface unit substantially assuring that updates of at least one predetermined parameter provided to said local switching office are also automatically provided to said call control system;

intercepting at said call control system a call to 9-1-1 from a respective remote calling instrument comprising a line identification;

determining at said call control system a call delivery number responsive to the line identification employing at least one of said at least one of said at least one predetermined parameter;

determining at said call control system a calling line telephone number responsive to the line identification;

creating at said call control system a call origination comprising the delivery number and the calling line telephone number; and forwarding the call origination from said call control system to the local switching office.

8. A method in accordance with claim 7 further including: collecting at said call control system digits from a call origination until a special number is determined.

9. A method in accordance with claim 7 further including: collecting at said call control system digits from a call origination only until a determination is made that no special number is being called.

10. A method in accordance with claim 7 wherein the call control system includes a translations database and wherein determining the call delivery number comprises applying the line identification to the translations database and wherein determining the calling telephone number comprises applying the line identification to the translations database.

11. A method in accordance with claim 10 further including:

employing said update interface unit for maintaining at said call control system the translations database in synchronization with a database in the local switching office.

12. A method in accordance with claim 11 wherein maintaining the translations database comprises monitoring an office administration and maintenance line connected to the local switching office for changes affecting any of the plurality of lines connected to the remote terminal and applying the changes at said call control system to the translations database.

13. A telephone network comprising:

an answering point configured to serve special number calls;

a local switching office connected to the answering point via a network;

a remote terminal connected to the local switching office and supporting a plurality of lines connected with a plurality of remote calling instruments; each respective remote calling instrument of the plurality of remote calling instruments being situated beyond a range of acceptable wireline transmission from the local switching office;

a call control system connected between the local switching office and the remote terminal and configured to monitor the plurality of lines for special number calls and further configured to deliver the special number calls to the answering point without intervention by the local switching office; and an update interface unit coupled with said call control system and with said local switching office; said update interface unit substantially assuring that updates of at least one predetermined parameter provided to said local switching office are also automatically provided to said call control system.

14. A telephone network in accordance with claim 13 wherein the call control system is configured to send a call origination to the local switching office comprising a destination telephone number and a calling telephone number.

15. A telephone network in accordance with claim 14 wherein the local switching office is configured to treat the call origination as a trunk-to-trunk call.

16. A telephone network in accordance with claim 14 further including a selective router and wherein the destination telephone number causes the local switching office to direct the call to the selective router.

17. A telephone network in accordance with claim 16 wherein the answering point comprises a plurality of answering points and wherein the selective router is configured to determine an answering point responsive to the calling telephone number and further configured to deliver the call origination to the answering point.

18. A telephone network in accordance with claim 16 wherein the answering point comprises a plurality of answering points configured to serve a predetermined area and wherein the selective router is configured to determine an answering point that serves the area of the calling telephone number.

19. A telephone network in accordance with claim 13 wherein the special number comprises 9-1-1 and the answering point comprises a public safety answering point.

20. A telephone network in accordance with claim 13 further comprising:
- said update interface unit being embodied in an office administration and maintenance (OA&M) system configured to update the telephone network;
- an OA&M monitor configured to monitor the OA&M system for updates that affect any of the plurality of lines and further configured to forward updates that affect any of the plurality of lines to the call control system.

* * * * *